INVENTOR.
LLOYD T. HENDRIX

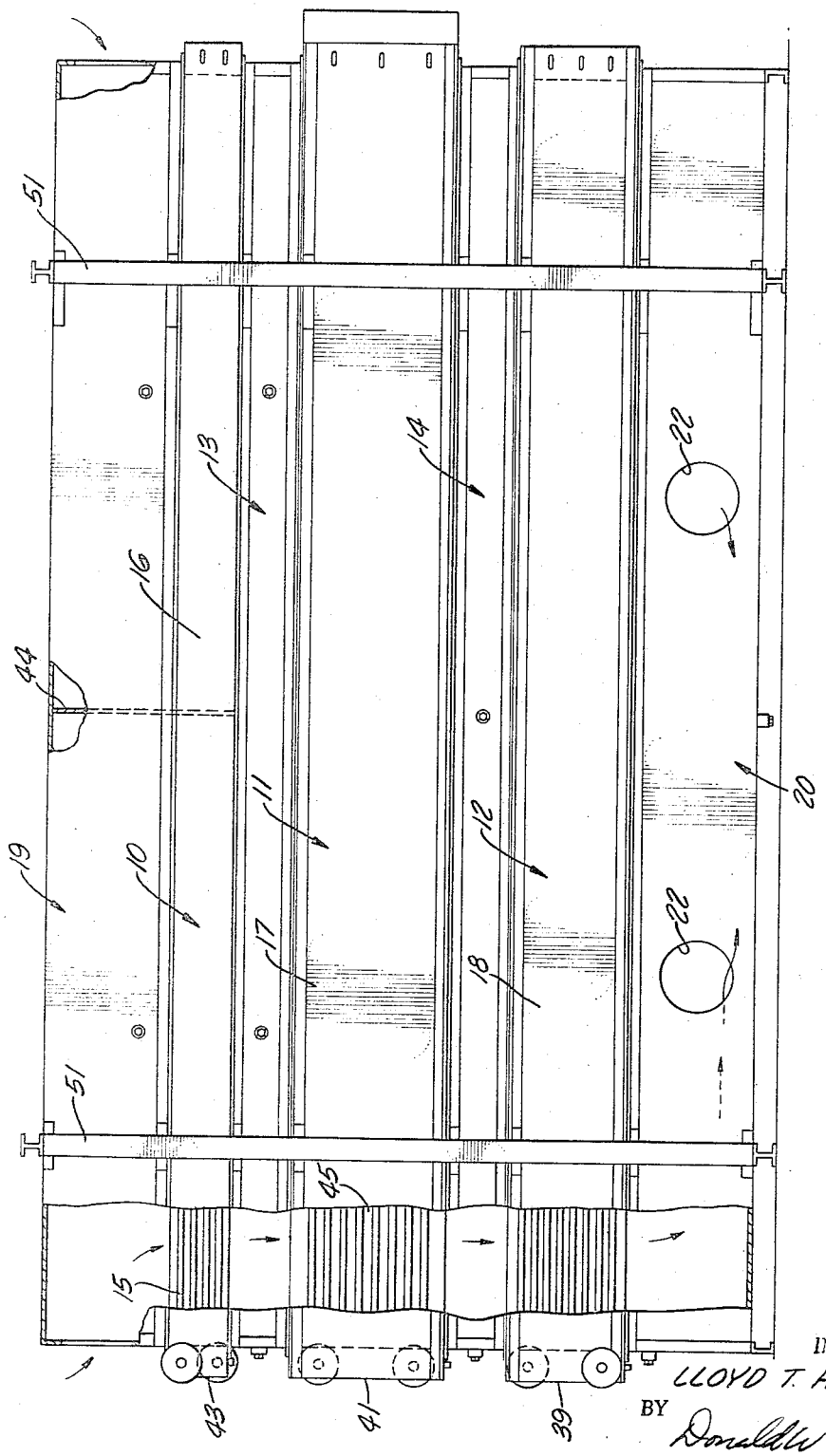

April 11, 1967

L. T. HENDRIX 3,313,274

STEAM GENERATOR

Filed Feb. 25, 1965

INVENTOR.
LLOYD T. HENDRIX
BY Donald W Canady
ATTORNEY

United States Patent Office 3,313,274
Patented Apr. 11, 1967

3,313,274
STEAM GENERATOR
Lloyd T. Hendrix, Santa Ana, Calif., assignor to Atlantic Richfield Company, a corporation of Pennsylvania
Filed Feb. 25, 1965, Ser. No. 435,128
8 Claims. (Cl. 122—7)

This invention relates to a waste heat generator and, more particularly, to a steam generator using as a heat source heated gases which otherwise would be exhausted to the atmosphere.

Many industrial processes result in the regeneration of large volumes of heated gases which normally are exhausted to the atmosphere. The use of gas turbine prime movers to provide mechanical power for industry is one particular example of such an industrial process. As such gas turbine engines have achieved more wide acceptance and use, is has been realized that the exhaust of large volumes of heated gases from these engines to the atmosphere constitutes a loss of thermal energy, and, thus, an economic loss. Recovery of the otherwise wasted thermal energy provides a source of heat for other industrial processes, and, thus, constitutes an economic saving.

The prior art has proposed that waste heat such as that contained in the exhaust gases of a gas turbine engine may be recovered through waste heat boilers or steam generators. Such steam generators taught by the prior art are subject to a variety of failings or shortcomings, including a susceptibility to scaling, and difficulty in access to any individual section of the steam generator for cleaning, repair or replacement.

It is an object of this invention to provide an improved waste heat steam generator of a unique construction.

Another object of this invention is to provide an improved waste heat steam generator less subject to scaling due to deposits from the water used and which can operate on ordinary tap water.

A further object of this invention is to provide a waste heat steam generator from which any individual heat exchange section may readily be removed for repair or replacement.

It is also an object of my present invention to provide a waste heat steam generator adapted to utilize the thermosyphonic effect to affect circulation from an external steam drum through a section of said waste heat steam generator.

Other objects of the invention will become apparent from the following description and claims when taken in conjunction with the accompanying drawings which disclose, by way of example, the principle of the invention and the best mode which has been contemplated of applying that principle.

In the drawings:

FIG. 2 is a side view, in partial section, of the waste heat steam generator illustrating the header box construction;

Briefly, the waste heat steam generator of the present invention employs a plurality of separate heat exchange sections, each section having an outer casing which defines a portion of the flow conduit for the heat source gases. The plurality of sections are joined by a plurality of coupling sections in such a manner as to fully define the flow path of the heat source gases while permitting any individual heat exchange section to be removed for repair or replacement. Some of the individual sections include extended surface tubes especially for low pressure gases, and these tubes are expanded into tube sheets in header boxes, an arrangement which leads to economy and ease in cleaning. One section serves as a feed water heater or economizer; another section is an evaporator or vaporizer and the top section exposed to hottest incoming gases is a superheater. Circulation of water through the vaporizer section is accomplished from a steam drum by the thermosyphon effect. Flow rates and water carry-over are carefully controlled to eliminate scaling effects.

Figure 1:
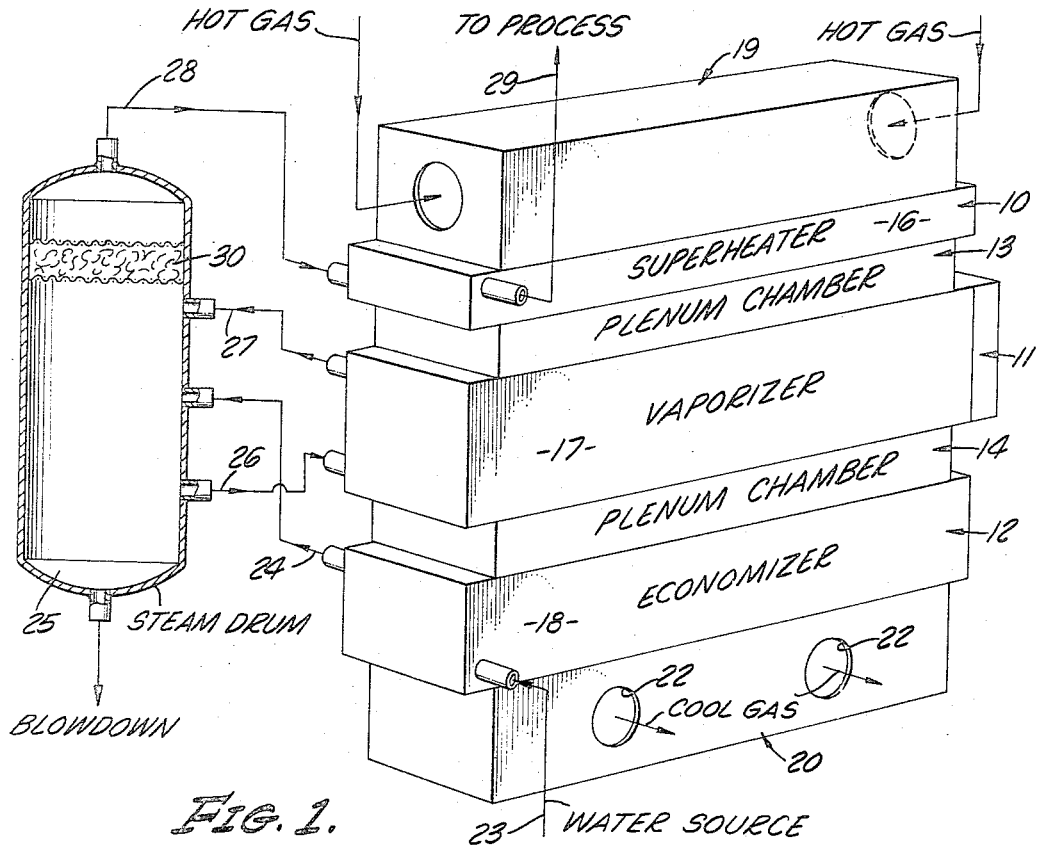
FIG. 1 is a perspective view of the waste heat steam generator of this invention with a schematic illustration of the fluid circulation system.
Figure 6:
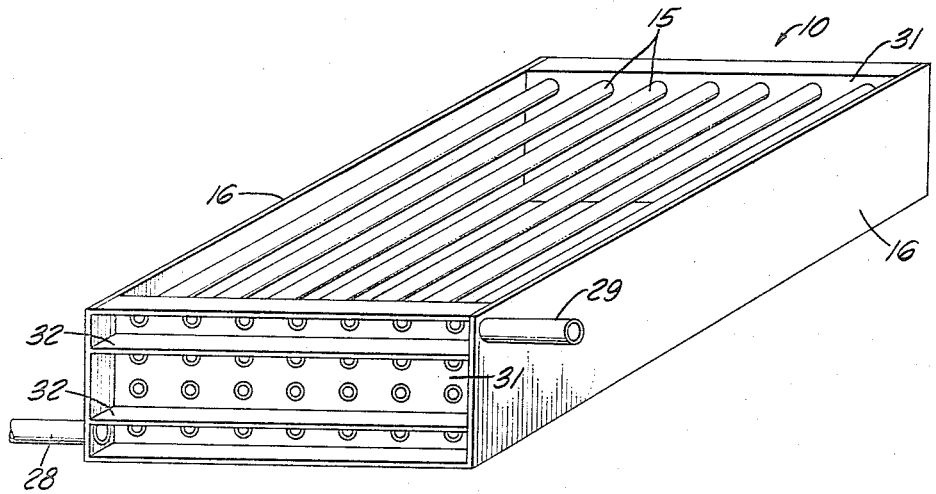
FIG. 6 is a perspective view of one heat exchange section showing the header box construction and flow paths of the water and steam.

The waste heat steam generator system of the present invention is illustrated in its entirety in FIG. 1. In the embodiment there shown, three heat exchange sections 10, 11, 12 are joined together with two connecting sections 13, 14. Each of the heat exchange sections 10, 11, 12 is formed as an individual module, with a load bearing outer casing formed from a sheet material. A completed heat exchange section, for example the superheater section 10 shown in FIG. 6, occupies a substantially rectangular solid volume, and encloses heat exchange tubes 15 which may contain steam which is to receive heat from the waste gases. The outer casing elements 16, forming the sides of the heat exchanger section 10, are joined in a substantially gas tight fashion to the adjacent coupling section 13. The outer casing members 16, in conjunction with the rectangular shaped plenum chamber or coupling section 13, define a conduit for the passage of the heat source gases.

The second and third heat exchange sections 11, 12 are similarly formed with outer casing elements 17, 18, which may define a substantially gas tight conduit. These sections 11, 12 are joined by a coupling section 14 formed in a manner similar to the earlier mentioned coupling section 13. Together, the outer casing elements 16, 17 and 18 of the three heat exchange sections 10, 11, 12 cooperate with the coupling sections 13, 14 to fully define the flow conduit for the source heat gases.

In order to complete the structure of the waste heat steam generator of the present invention and to assist in smooth flow of the source heat gases into and through the heat exchange sections 10, 11, 12, plenum chambers 19, 20 are provided at the inlet and outlet for the heat source gases. The inlet plenum chamber 19 receives the heat source gases from any available source, which may be a gas turbine prime mover (not shown), through a suitable conduit system which is not shown in detail and may be any suitable conventional means. Hot gases from two or more compressors may be fed into opposite ends of a single plenum, as shown in FIG. 1, without interfering pressure pulses by utilizing a baffle or divider plate 44. The exhaust plenum chamber 20 provides a basing upon which the completed waste heat steam generator of this invention may rest and has exit openings 22 through which the spent heat source gases may leave the steam generator structure and be carried away to the atmosphere through any suitable conventional stack or flue. As may be understood, the use of the outer casing elements 16, 17, 18 of the heat exchange sections 10, 11, 12, in conjunction with the coupling sections 13, 14 and the plenum chamber 19, 20 to define the flow conduit for the heat source gases avoids the requirement existing in the prior art that a separate pressure vessel be employed to control the flow passage of the gases.

Figure 3:
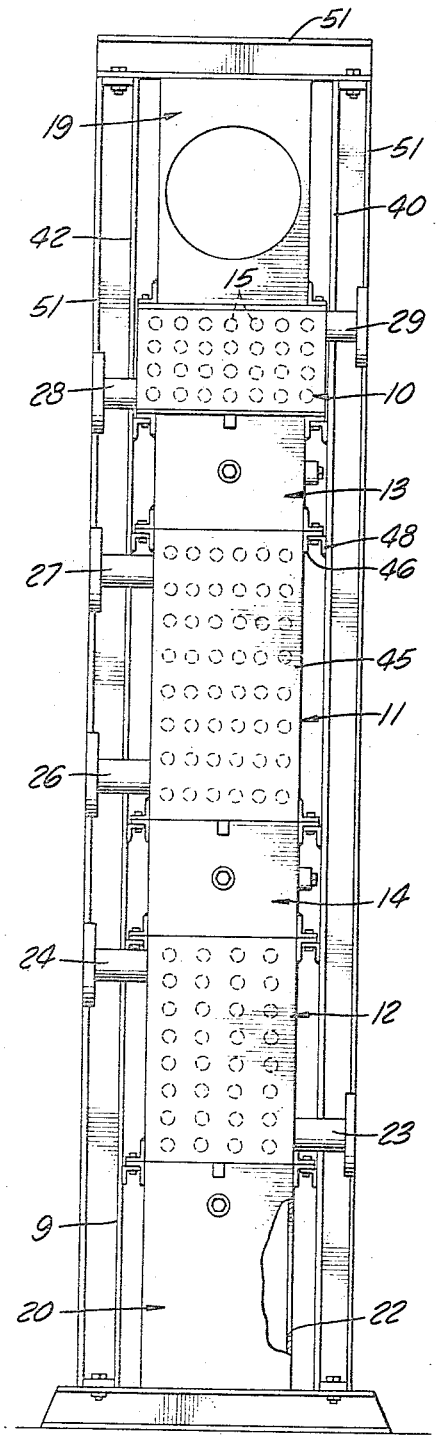
FIG. 3 is an end view, in partial section, of the waste heat steam generator shown in FIG. 2 illustrating one manner of connecting the tube bundles to the support frame.

FIGS. 2 and 3 show an embodiment of the present invention wherein the outer casing side elements 16, 17, 18, the plenum chambers 19 and 20 sides, and the coupling section 13 and 14 sides are formed integrally as a single element, i.e., casing member 40 (and back side casing member 42). "H" channels 51 may be employed to lend structural rigidity to the unitary structure. When such unitary outer casing construction is employed, however, the end casing elements 39, 41, and 43 for the economizer, vaporizer, and superheater sections, respectively, are separably formed to permit removal of the individual tube bundles from their respective sections.

Figure 4:
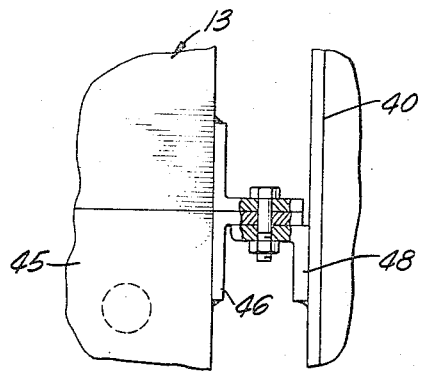
FIG. 4 is an enlarged view showing in detail the manner of bolting the tube bundle and plenum chamber to the support frame structure.
Figure 5:
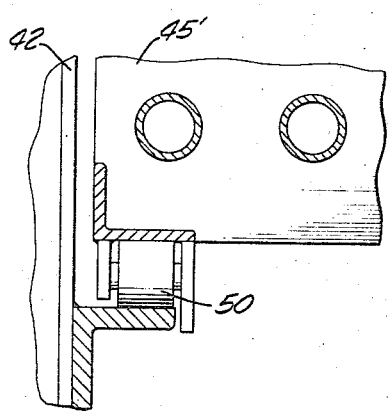
FIG. 5 is an end view of a preferred form of a tube bundle-support frame connector.

In order to permit removal of any heat exchange section from the waste heat steam generator of the present invention for purposes of cleaning, repair or replacement, the present invention employs separable end connecting means between the adjacent heat exchange sections and plenum or coupling sections for connecting the tube bundles to the heat exchange section outer casing(s). For example, FIGS. 3–5 illustrate the details of the coupling means provided for the heat exchange sections which permit disengaging the tube bundles from their respective sections in the event that one or more of the tube bundles must be removed. In FIGS. 3 and 4 the tube bundle 45 is joined to a horizontally disposed channel member 46 which is supported between the unitary outer casing elements 40 and 42 below plenum chamber 13 by bolting to the outer casing channel 48. The tube bundles may also be supported vertically between plates 40 and 42 on rollers 50, as shown in FIG. 5 or skids (not shown) to permit easy removal.

The evaporator heat exchanger section 11 and economizer heat exchanger section 12 are similarly provided with separable connecting means for engaging the adjacent elements of the waste heat steam generator structure. This use of separable connecting means in conjunction with the outer casing structure to define the flow path for the source of heat gases avoids the necessity of opening any pressure vessel or otherwise doing undue violence to the steam generator structure when it becomes necessary to remove only a single section for cleaning, repair or replacement.

In order to substantially improve the resistance of the steam generator of the present invention to the deterioration of heat exchangers normally resulting from scaling effects, a particularly effective circulation system is employed. As illustrated in FIG. 1, the plurality of heat exchange sections may embody a superheater 10, an evaporator or boiler 11, and an economizer 12. As steam is removed from the superheater section 10 through conduit 29 and applied to the desired use, feed water is introduced into the feed water heater 18 through a feed water line 23 from any suitable source to balance the quantity flow demand. On leaving the feed water heater, the water is then introduced through a line 24 into the evaporator feed supply contained within the steam drum 25.

Circulation of water to the evaporator section 11 of the present steam generator in conjunction with the delivery into the evaporator supply of pre-heated water, is accomplished in such a manner as to reduce scaling. A single downcomer 26 is used to supply water from the steam drum 25 to the evaporator heat exchange section 11, with a single return pipe 27 also being used. Circulation to the evaporator heat exchange section 11 is dependent upon the thermosyphon effect rather than being forced by a conventional pump. While the precise flow rate of water required in the thermosyphon loop must be experimentally determined for water of the hardness available in any particular use location, the circulation rates are established so as to preclude the formation of scale in the evaporator section, even though "tap" water or some other source not purified for boiler use is used. Regarding the thermosyphon effect, the water in the steam drum is one leg and the water-steam mixture in the tubes of the vaporizer section is the less dense leg of the thermosyphon. Scaling is prevented by the removal of water and steam from the vaporizer section so that the water washes or removes any deposits formed during partial evaporation in the vaporizer section. The circulation rate of the water and steam mixture through the evaporator section may be controlled by setting the height of the drum. The higher the water level in the drum, the higher the thermosyphon circulation rate, that is, up to the point where the pressure drop is so great that additional circulation cannot be obtained.

Following the separation of water in the steam drum 25, the steam flow is directed through a single conduit 28 to the superheater heat exchange section 10, from which steam is delivered to the desired use through a conduit 29. The steam drum 25 and scrubbing element 30 are so constructed that the carry-over of water particles into the superheater from the steam drum is prevented, thus avoiding scaling of the superheater.

The flow paths of the water and steam through the heat exchange sections 10, 11, 12 of one embodiment of a waste heat steam generator constructed in accordance with the present invention will be analyzed in order to clarify the manner in which the invention may be applied. As shown in FIG. 3, header boxes are defined across the ends of a heat exchanger section 10 by vertically positioned baffles 31 which serve as tube sheets to receive the ends of straight tube members 15. Within the header boxes defined by the vertically extending baffles 31 and the outer casing elements 16 of the superheater heat exchange section 10 are positioned horizontally extending baffles 32 which may divide the header box to determine the flow path followed by steam moving through the heat exchange tubes 15. In order to accommodate the effects of thermal expansion and contraction, the heat exchange tubes 15 are fixed to the vertically extending baffle 31 and the inlet header box and have a floating engagement with the vertically extending baffle 31 at the turn-around end of the section 10. Four rows of tubes, having seven tubes a row, are employed in the superheater section 10, with the horizontal baffles 32 positioned to provide a four-pass operation. This operation is obtained by employing two horizontal baffles at the inlet end of the section 10, positioned between the first and second rows and the third and fourth rows. At the turn-around end of the section 10, a single horizontal baffle is positioned between the two center rows. Inlet of steam is to the area defined below the lower horizontal baffle 32 positioned across the header box at the inlet end of the section 10. Thus, steam is admitted to a single row of tubes, at the relatively cooler side of the superheater section 10. Steam flows in parallel through the seven tubes of each row to obtain the four-pass flow pattern. Due to the temperature at levels involved, and the heat exchange rates available, bare tubes are employed.

In the vaporizer section 11, eight tubes per row are employed in a six-row, two-pass configuration. Thus, a single horizontal baffle member is positioned between the center rows at the inlet end header box. The vaporizer section differs from the superheater section 10 in that the turn-around end of the section 11 does not employ a header box defined solely by the outer casing elements 17 and a vertically positioned baffle, but instead employs U-curved tubes. Finned tubes are employed in order to obtain the desired heat exchange characteristics.

In the economizer section 12, inlet end and turn-around end header boxes are formed in a manner substantially similar to that employed in the superheater section 10, by the outer casing elements 18 and vertically extending baffle members. Finned tubes are employed in an eight tube per row configuration, with four rows. Horizontally positioned baffles, similar to those employed in the superheater section 10, define a four-pass configuration.

While illustrated as using exhaust gases from a gas turbine, the heat source for the generation of steam may be any available source of a relatively low pressure moderate temperature gas. By low pressure is intended the normal range of pressures available from the exhaust of an industrial gas turbine engine, while moderate temperature would similarly indicate the temperatures of such exhaust gases. One example of a steam generator constructed in accordance with the present invention was designed to receive gases having temperatures around 760° F. and exhaust the gases at a temperature of around 350° F. In this example steam generator, steam leaving the superheater was at approximately 500° F. and 225 p.s.i.g. Good thermal efficiency, in conjunction with economy of operation, is achieved by the heat source gases flow pattern over the superheater, evaporator, and feed water heater exchange sections, in that order, and the water and steam flow always being countercurrent in temperature gradient.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

I claim:

1. A waste heat steam generator comprising: a pularity of heat exchange sections, each of said sections having an outer casing and tubes in a tube bundle for containing a heat exchange fluid, coupling sections joining said outer casings to define with said casings a flow conduit for heat source gases, plenum sections attached to two of said sections to define entrance and exit chambers for heat source gases flowing through the flow conduit, means joining said plenum sections, said coupling section, and said heat exchange sections whereby any of said tube bundles may individually be removed, an external steam drum receiving said heat exchange fluid from one of said tube bundles, a single downcomer conduit and a single return conduit arranged for circulating said heat exchange fluid from said steam drum to another of said tube bundles by thermosyphonic flow, and means associated with said steam drum for separating the vapor phase for delivery to yet another of said tube bundles.

2. The apparatus of claim 1 wherein said entrance plenum section is adapted to receive flow from two sources, and said appartus includes vertically disposed baffle means within said entrance plenum section to prevent interfering pressure pulses from said sources.

3. The apparatus of claim 1 wherein the side portions of said outer casings, said coupling sections, and said plenum sections are a single member on each side of said waste heat steam generator.

4. The apparatus of claim 3 including means affixed to said single side member for removably supporting said tube bundles within said waste heat steam generator and means associated with said tube bundles for engaging said support means whereby said tube bundle may be removed from said waste heat steam generator.

5. The apparatus of claim 4 wherein said means associated with said tube bundle comprises roller means.

6. A waste heat steam generator comprising: an economizer section, an evaporator section, a superheater section, each of said sections having an outer casing and tubes in a tube bundle for containing a first heat exchange fluid, a first coupling section joining the outer casings of said economizer and evaporator sections, a second coupling section joining the outer casings of said evaporator and superheater sections, an inlet plenum chamber joining the outer casing of said superheater section, an outlet plenum chamber joining the outer casing of said economizer section, said plenum chambers, coupling sections, and sections together defining a flow conduit for heat source gases, means joining said plenum chambers, said coupling sections, and said sections whereby any of said tube bundles may individually be removed, header boxes defined within said sections for receiving a first heat exchange fluid and distributing it to said tubes, a source for first heat exchange fluid to be supplied to an inlet header box of said economizer, an external steam drum receiving said heat exchange fluid from said economizer, a single downcomer conduit and a single return conduit arranged for circulating said heat exchange fluid from said steam drum through said evaporator section in the form of a mixture of steam and water particles, a steam separator within said steam drum, a single conduit delivering steam separated by said separator to said superheater, a single conduit delivering steam from said superheater to any use, and said superheater, evaporator and economizer arranged for heat source gas flow in that order.

7. A waste heat steam generator constructed in accordance with claim 6 in which said superheater section employs bare tubes, and said evaporator and economizer sections employ finned tubes.

8. A waste heat steam generator comprising: a plurality of heat exchange sections, each of said sections having an outer casing and tubes in a tube bundle for containing a heat exchange fluid, coupling sections joining said outer casings to define with said casings a flow conduit for heat source gases, plenum sections attached to two of said sections to define entrance and exit chambers for heat source gases flowing through the flow conduit, means joining and plenum sections, said coupling sections, and said heat exchange sections, each of said heat exchange sections being individually supported by horizontal support means associated with said joining means whereby each of said tube bundles may individually be removed, an external steam drum receiving said heat exchange fluid from one of said sections, means for circulating said heat exchange fluid to another of said sections by thermosyphonic flow, and means associated with said steam drum for separating the vapor phase for delivery to yet another of said sections.

References Cited by the Examiner

UNITED STATES PATENTS

| | | | |
|---|---|---|---|
| 1,973,968 | 9/1934 | Weigel et al. | 122—7 |
| 2,547,589 | 4/1951 | Marshall | 122—7 |
| 2,552,505 | 5/1951 | Patterson | 122—7 |
| 2,916,021 | 12/1959 | Bastek. | |
| 3,147,742 | 9/1964 | May | 122—7 |

CHARLES J. MYHRE, *Primary Examiner.*